United States Patent [19]

Vieilleribiere

[11] 3,927,338

[45] Dec. 16, 1975

[54] AUTOMOTIVE BRIDGE ASSEMBLY

[75] Inventor: Henry Vieilleribiere, Colomiers, France

[73] Assignee: Motorola, Inc., Chicago, Ill.

[22] Filed: Jan. 2, 1975

[21] Appl. No.: 538,230

[52] U.S. Cl. .................................. 310/68 D; 321/47
[51] Int. Cl.² .......................................... H02K 11/00
[58] Field of Search .................... 310/68 D; 321/8 R

[56] References Cited

UNITED STATES PATENTS

| | | | |
|---|---|---|---|
| 3,295,046 | 12/1966 | Margaira | 321/8 R |
| 3,641,374 | 2/1972 | Sato | 310/68 D |
| 3,739,209 | 6/1973 | Drabik | 310/68 D X |
| 3,739,210 | 6/1973 | Bahlinger et al. | 310/68 D |
| 3,777,193 | 12/1973 | Buehner | 310/68 D |
| 3,812,390 | 5/1974 | Richards | 310/68 D |
| 3,866,072 | 2/1975 | Nagai | 321/8 R X |

*Primary Examiner*—William M. Shoop
*Attorney, Agent, or Firm*—Vincent J. Rauner; Henry T. Olsen

[57] ABSTRACT

An alternator rectifier bridge assembly is described. This assembly is made using all metal parts for the principal pieces of the bridges. The positive heat sink is made as a single piece and is used as the mounting member for a plurality of phase input plates and a plurality of negative heat sinks. The negative heat sinks are positioned on a first side of the positive heat sink. The phase input plates are positioned on the second side of the positive heat sink. The phase input plates carry a pair of diodes and each diode is positioned with the proper orientation in contact with either the positive heat sink or the negative heat sink by a sealing member.

11 Claims, 8 Drawing Figures

AUTOMOTIVE BRIDGE ASSEMBLY

BACKGROUND OF THE INVENTION

The rectifier bridge is a standard circuit for converting three phase alternating current to direct current. Each phase of the alternating signal is connected to a phase input plate which transmits the signal to a pair of diodes. The positive end of one diode and the negative end of the second diode are connected to the phase input plate. Each diode conducts on alternate half waveforms of the alternating current signal. In this manner a direct current is applied to an output point. The output point being the positive heat sink. Three sets of input plates are utilized because the output signal from the alternating current source is a three phase signal. More or less phase plates can be utilized with generators of a comparable number of phases.

In the prior art, such a rectifier bridge was faced with certain problems. The first problem is to dissipate the heat generated during the rectification process. A complication in this heat dissipation problem is that each of the main components of the bridge, i.e., the positive heat sink, the negative heat sink and tha phase input plates must be isolated one from the other. In U.S. Pat. No. 3,739,210, the components are positioned so as to be substantially in the same plane but this means that each of the main components is of smaller size. The small size of each part makes the heat dissipation problem worse.

The second problem is cost. U.S. Pat. No. 3,641,374 teaches the use of a rectifier bridge using a printed circuit board as the principal mounting element. However, the printed circuit board costs much more than the all steel members of the present design.

SUMMARY OF THE INVENTION

The present invention relates to rectifier bridges and, more particularly, to a low cost three phase rectifier bridge.

An object of the present invention is to provide a rectifier bridge assembly of low cost by using metal members.

Another object of the present invention is to provide a rectifier bridge wherein the principal members are insulated one from the other by a material which is both an insulator and an adhesive.

A further object of the present invention is to provide a rectifier bridge having good heat dissipating characteristics.

A still further object of the present invention is to provide a rectifier bridge assembly wherein the positive heat sink is used as the principal mounting member.

These and other objects will become evident in view of the following drawings.

BRIEF DESCRIPTION OF THE INVENTION

The present invention is directed to a rectifier bridge assembly having a principal mounting member which functions as the positive heat sink. Since the positive heat sink is cooled by convection, this makes the positive heat sink as large as possible. Each of the negative heat sinks is positioned on one side of the positive heat sinks. Each of the input phase plates is carried by the opposite side of the positive heat sink and provides a means for orienting the rectifying diodes used in the bridge assembly.

Each of the negative input plates is spaced from, yet adhere to, the positive heat sink by a bonding material which is both an insulating material and an adhesive material. Also, each of the phase input plates is mounted on the opposite side of the positive heat sink by the same adhesive-insulating material.

The completed assembly contains a plurality of components for holding the rectifier diodes. Certain of these components, for holding the diodes, are formed by a combination of apertures in the phase input plate and the positive heat sink. In this situation the diode rests upon the negative heat sink and is oriented so as to conduct current during the negative half of the A.C. signal. Certain others of the components for holding the rectifier diodes are formed by an aperture in the phase input plate plus a dimple in the positive heat sink. In this situation, the rectifier rests within the dimple and upon the positive heat sink and is oriented so as to conduct current in the positive half of the A.C. signal.

Each of the diodes mentioned hereinabove are held against their respective heat sinks and are held spaced from the other parts of the rectifier bridge assembly by a sealing capsule which fits over each diode and is joined to the phase input plate in such a manner to bear against the diode for maintaining each diode in its proper position.

DETAILED DESCRIPTION OF THE INVENTION

Figure 1:
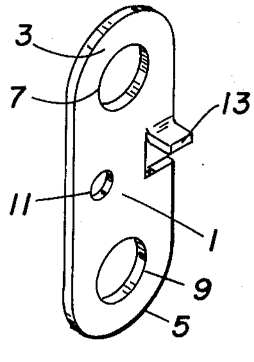
FIG. 1 shows an isometric view of the phase input plate.

Referring to FIG. 1 there is shown an isometric view of the phase input plate. The phase input plate 1 is of general rectangular configuration having curved end portions at 3 and 5. These curved end portions are of a matter of design and are not a limitation. The input plate carries a plurality of apertures at 7, 9 and 11. Apertures 7 and 9 are of oversized dimensions with respect to the rectifying diodes used in the rectifier bridge. The diodes, as will be described in greater detail hereinafter, are positioned within the apertures 7 and 9 but are not in contact with the phase input plate 1. Aperture 11 is a bolt hole, and is used to receive a bolt for bolting the bridge to its support member. Attachment lug 13 is formed from a portion of the phase input plate 1 and extends above the main surface 15 of the input plate. Lug 13 is centrally positioned for easy access and easy attachment to the wires from the alternator. In the event that additional or fewer phases are available from the source of alternating current, the number of phase input plates would be reduced or increased as required.

Figure 2:
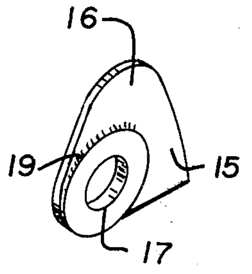
FIG. 2 shows an isometric view of the negative heat sink.

Referring to FIG. 2 there is shown an isometric view of the negative heat sink plate 16. The heat sink plate comprises an all metal piece and has an aperture at 17. The aperture 17 is used for an oversized mounting lug whereby the bolt passing through the aperture 11, as shown in FIG. 1 of the phase input plate, passes through the negative heat sink plate with sufficient clearance such that the attachment bolt does not touch the negative heat sink. The primary aperture 17 of the negative heat sink plate is defined by a side wall of the negative heat sink plate. However, the negative heat sink plate 16 has a smaller aperture defined by a wall 19 which is larger in radius than the aperture 17. This larger aperture is used for a recessed mounting means.

Referring to FIG. 3 there can be seen an isometric view of the positive heat sink 20 employed in the present invention. The positive heat sink 20 employs a plurality of apertures 21, 23 and 25 which are used as bolt holes for attaching the rectifier bridge to the alternator housing. The positive heat sink 20 also carries a plurality of apertures 27, 29 and 31 which are called negative heat sink apertures because the positive end of the diodes are in contact with its negative heat sink. Apertures 33, 35 and 37 are called positive apertures as the negative side of the diode is in contact with the positive heat sink and the positive side of the diode is in contact with the phase plate.

As seen in FIG. 3, the positive heat sink plate 20 is formed with a dimple-like member indicated generally at 39 having a bottom plate 41 and a side plate 43. The side plate 43 is generally cone shaped. The smaller entrance being at the bottom while the larger area is at the top. The bottom surface 41 extends below the main surface 45 of the positive heat sink plate 20. A square shaped aperture 47 is available for attaching a battery cable from the rectifier bridge to the battery to be charged.

The positive heat sink plate has three dimpled areas to receive three of the diodes used in the three phase rectifier bridge and has three additional apertures for allowing three additional diodes to pass through the positive heat sink without touching the positive heat sink plate. In this manner, the three positive diodes rest upon the positive heat sink plate while the three negative diodes pass through the positive heat sink plate and are in contact with the negative heat sink positioned on the opposite side of the positive heat sink plate. In its broadest sense, it can be said that the negative and positive heat sink plate are nested one within the other such that the positive and negative heat sink plate do not have members which extend beyond the sum of the total of the thickness of the two.

Figures 3A, 3B, 4:
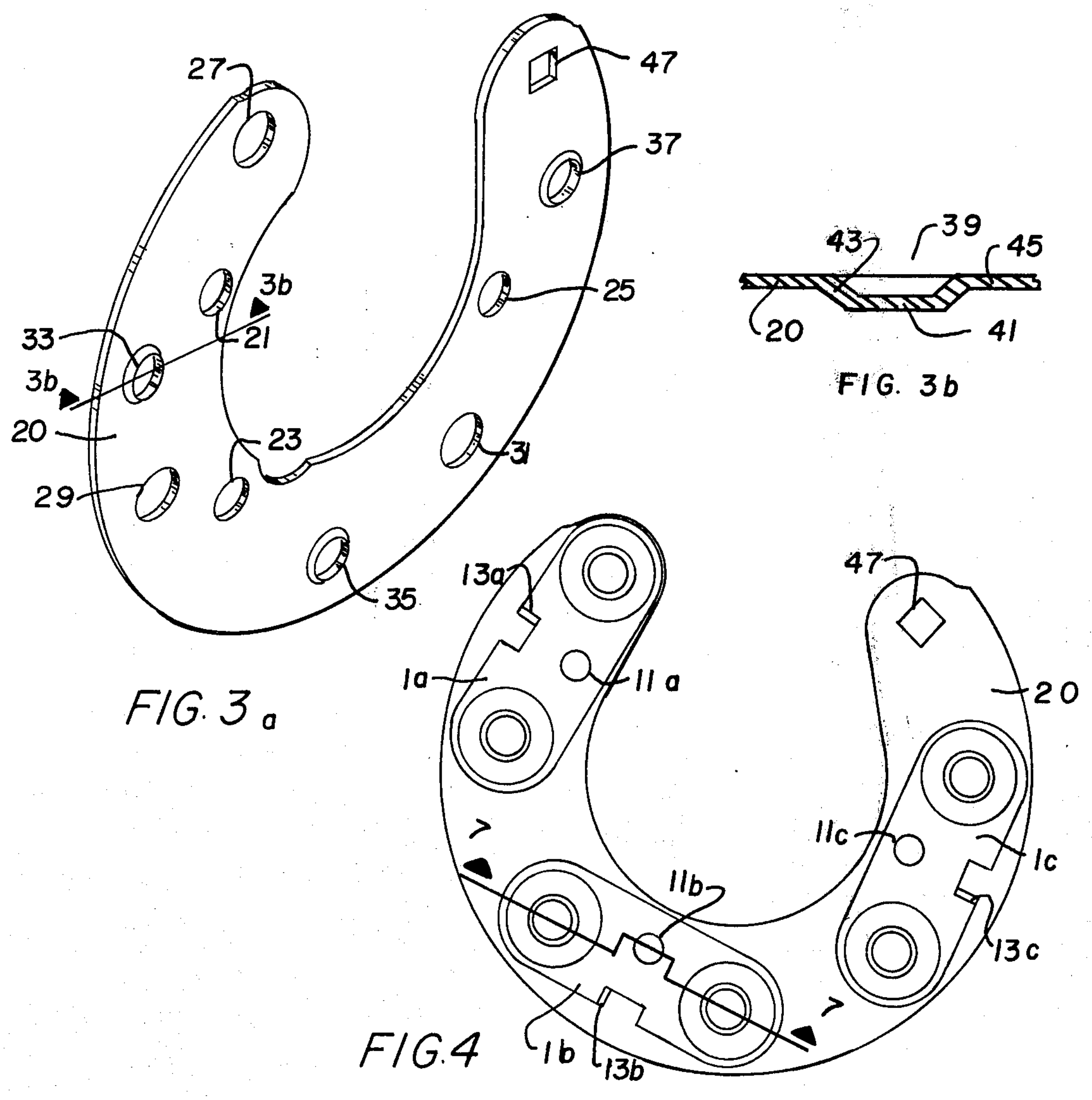
FIG. 3*a* shows an isometric view of the positive heat sink.
FIG. 3*b* shows a cross-sectional view taken along the lines 3*b*—3*b* of FIG. 3*a*.
FIG. 4 shows a top view of the rectifier bridge assembly.

Referring to FIG. 4, there is shown a top view of the rectifier bridge assembly. The positive heat sink plate is shown at 20 with a plurality of phase input plates shown at 1A, 1B and 1C. The phase input lugs are shown at 13A, 13B and 13C. The bolt apertures for bolting the rectifier bridge assembly to the alternator are shown at 11A, 11B and 11C, respectively. The battery connection is shown at 47. The positive heat sink plate is generally horseshoe shaped in top view and is a single member thereby achieving maximum heat dissipation.

Figure 5:
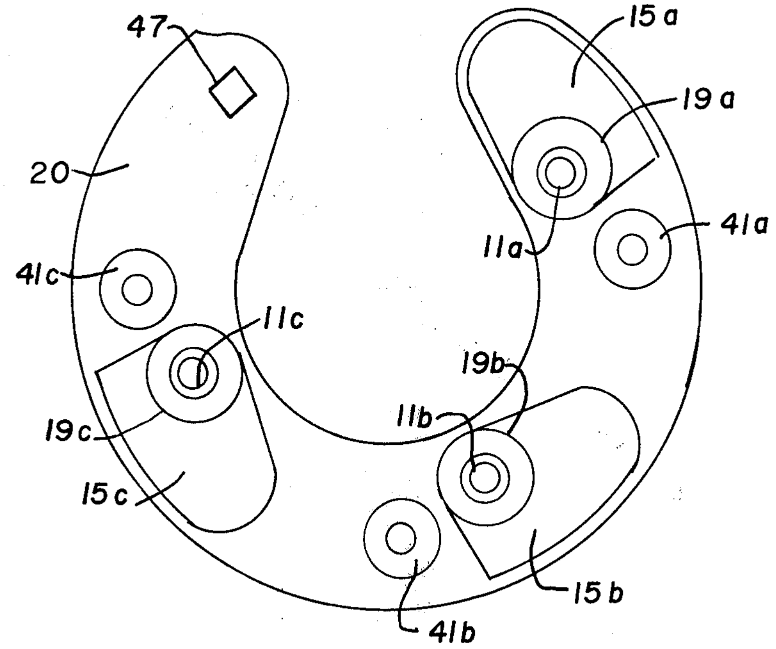
FIG. 5 shows a bottom view of the rectifier bridge assembly.

Referring to FIG. 5 there can be seen the underside view of the rectifier bridge assembly. Again the positive heat sink is shown at 20 with a plurality of negative heat members shown at 15A, 15B and 15C. The dimpled members from the positive heat sink are shown at 41A, 41B and 41C. The bolt hole for attaching the assembly to the alternator are again shown at 11A, 11B and 11C. The enlarged aperture associated with the negative heat sink members are shown at 19A, 19B and 19C. Again the battery aperture is shown at 47.

Figure 6:
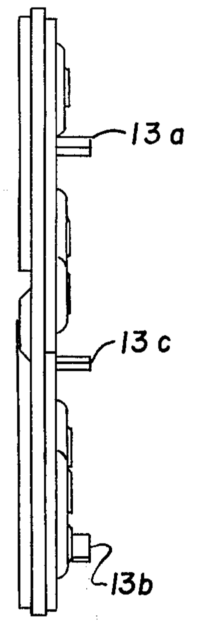
FIG. 6 shows a side view of the rectifier bridge assembly.

Referring to FIG. 6 there can be seen a side view of the rectifier bridge assembly. The phase lugs are shown at 13A, 13B and 13C.

Figure 7:
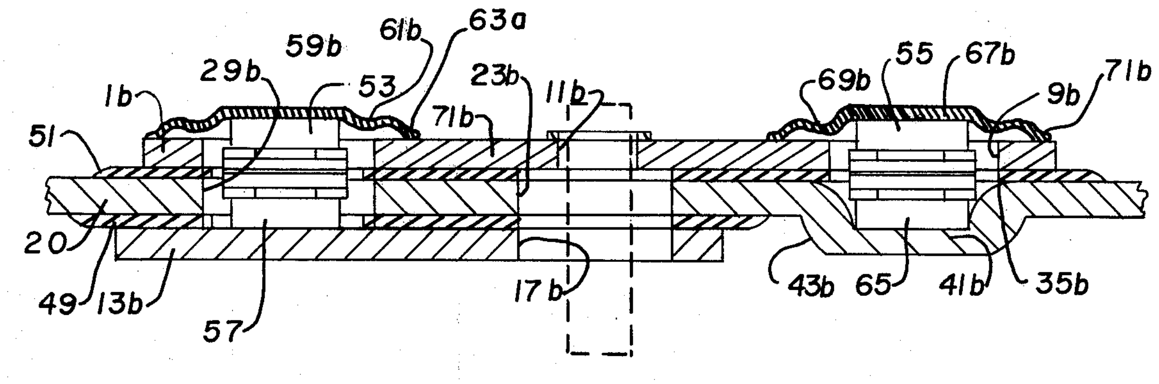
FIG. 7 shows a cross-sectional view taken along the line 9—9 of FIG. 7.

Referring to FIG. 7 there is shown a cross-sectional view taken along the line 7—7 of FIG. 4. The negative heat sink plate is shown at 13B separated from the positive heat sink plate 20 by a first layer of material 49 which is used as an insulator between the positive and negative heat sink as well as an adhesive for joining the positive and negative heat sink members together. The phase input plate is shown at 18 with a second layer of material 51 intermediate the phase plate 18 and the positive heat sink 20. This layer 51 also operates as a means for insulating the phase input plate from the positive heat sink member as well as an adhesive for joining the positive heat sink plate to the phase input plate. A plurality of rectifier diodes are shown at 53 and 55. Each diode has a positive terminal and a negative terminal. A diode in contact with the positive heat sink conducts current during the positive half of an A.C. signal. A diode in contact with the negative heat sink conducts current during the negative half of the A.C. signal.

The rectifying diode 53 has its negative end 57 resting on the negative heat sink plate 13B. The diode 53 is spaced from the end walls 7B and 29B of the phase input plate and positive heat sink member 20 by the sealing capsule plate 59B. The sealing capsule plate 59B has guide means 61 formed as an integral part of the sealing plate which encircles the diode and provides a means for holding the rectifying diode within the center of the aperture defined by the walls 7B and 29B of the phase input plate 1B and positive heat sink plate 20, respectively. The sealing plate 59B has a contact means 63B which is attached by cold welding to the phase input plate. Apertures 11B, 23B and 17B provide a passageway for receiving a bolt or other attaching mechanism for attaching the assembly to a support member not shown. Typically, a washer would be placed between the bolt and the phase input plate and positioned to encircle to first aperture 11B. Thereafter, the bolt would pass through the other two apertures and be centrally spaced so as not to touch either the positive heat sink member 20 or the negative heat sink member 17B. Referring to the second diode assembly 55, the diode is centrally located and has its end 65 resting against the positive heat sink member 20 in contact with the bottom member 41B. The second sealing capsule 67B again has a guide portion 69B for positioning the diode 55 centrally within the aperture 9B of the phase input plate. A contact member 71B is formed as an integral part of the closure plate 67B.

OPERATION OF THE INVENTION

The principal advantage of the present invention lies in the relationships of the three principal subassembly members. These members are the positive heat sink plate as the principal mounting member and heat dissipation member made in one piece for maximum heat dissipation, in combination with smaller negative heat sink members adapted for contact to a support member such as the alternator housing in a car. The phase input plates are positioned on the opposite side of the positive heat sink member and are adapted to hold a pair of diodes in proper relationship to the heat sink members, respectively. The sealing capsule is employed for holding the diode in contact with their respective heat sink members as well as for maintaining the proper orientation of the diode with its respective heat sink yet spaced from the remaining parts of the rectifier bridge.

In the preferred embodiment, the silicon diodes are made of a silicon chip between two copper slugs and the finished diode is then a sandwich which can be tested easily at high current values before being inserted in the bridge. Usually in a prior art sandwich bridge similar to this one, the diodes which are used are made with one slug on one side of the chip and the lead on the other side so that they are not easily testable. The usage of the button type of diode allows a very significant improvement in final test yield. The material used in the positive heat sink preferably allows the soldering of the diode and the gluing of the insulating material. Such a suitable material can be nickel plated or copper plated steel.

The negative heat sinks are of small surface area and are cooled by thermal conductions with the alternator flange. The alternator flange also gives an electrical contact and the grounding of the negative heat sinks. The material used for the negative heat sinks and the phase input plates is the same as for the positive heat sinks.

The sealing capsules are made out of a soft metal with good electrical characteristics such as copper and their shape is such that it allows thermal deformation with a minimum of transmission of efforts to the silicon. Furthermore, they insure a sealing without leakage of the diode compartment.

The general assembly of the heat sink with the phase inputs plates is done with an insulating material by gluing. The insulating material maintains a given thickness between the different steel plates. The nature of the glue and of the insulating material can vary according to the specification to be met. The insulating material can even be prepeg.

While there have been shown and described and pointed out the fundamental novel features of the invention as applied to the preferred and other embodiments, it will be understood that various omissions and substitutions and changes in the form and details of the structural element may be made by those skilled in the art without departing from the spirit of the invention.

What is claimed is:

1. A rectifier bridge assembly, comprising:
a positive heat sink member having at least one aperture and one recessed region and being formed as a single unit with a first side and a second side;
a negative heat sink member positioned under said aperture, and said negative heat sink being attached to the first side of said positive heat sink member and being insulated therefrom;
a phase input plate having at least a pair of apertures, one of said apertures being in registration with said aperture carried by said positive heat sink member, the second of said apertures being in registration with said recessed region carried by said positive heat sink member, and said phase input plate being attached to the second side of said positive heat sink member and being insulated therefrom;
a rectifying diode being positioned in each aperture carried by said phase input plate; and
sealing means for individually holding each of said diodes in contact with its respective heat sink and for individually holding each of said diodes away from the other heat sink.

2. The rectifier bridge assembly as recited in claim 1 wherein:
said recessed region of said positive heat sink is positioned substantially in the same plane as said negative heat sink.

3. The rectifier bridge assembly as recited in claim 1 wherein:
said phase input plate carries an attachment lug formed from an integral portion of said phase input plate.

4. A rectifier bridge assembly comprising:
a positive heat sink member carrying a plurality of apertures and a plurality of recessed regions, and being formed as a single unit with a first side and a second side, and one of said apertures being positioned adjacent one of said recessed regions;
a plurality of negative heat sink members, and each of said negative heat sink members being mounted to a first side of said positive heat sink member and being positioned under one of said apertures carried by said positive heat sink member, and each of said negative heat sink members being insulated from said positive heat sink member;
a plurality of phase input plates, and each of said plates carrying a pair of apertures, one of said apertures being in registration with one of said apertures carried by said positive heat sink member, the second of said apertures being in registration with an adjacent recessed region of said positive heat sink member, and said phase input plate being attached to the second side of said positive heat sink member and being insulated therefrom;
a rectifying diode being positioned in each aperture carried by said phase input plate; and
sealing means for individually holding each of said diodes in contact with its respective heat sink, and for individually holding each of said diodes spaced from the other heat sink.

5. The rectifier bridge assembly as recited in claim 1, wherein:
said recessed region of said positive heat sink is positioned substantially in the same plane as said negative heat sink.

6. The rectifier bridge assembly as recited in claim 1, wherein:
said phase input plate carries an attachment lug formed from an integral portion of said phase input plate.

7. A rectifier assembly, comprising:
a plurality of sets of devices, and one diode in each set conducting current for a first half of an alternating signal applied to said set, and a second diode in each set conducting current for a second half of an alternating signal applied to said set;
a first heat sink plate supporting said one diode in each set;
a second heat sink member supporting said second diode in each set of diodes;
first insulating means separating said first heat sink from said second heat sink;
phase input means receiving each set of diodes;
second insulting means separating said first heat sink from said phase input means; and
sealing means in operative relationship with said phase input means for individually holding each of said diodes in contact with its respective heat sink;

and for individually holding each of said diodes spaced from the other heat sink.

8. The rectifier assembly as recited in claim 7, and further including;

means mounted on said phase input plate for reception of one phase of an alternating signal.

9. The rectifier assembly as recited in claim 7, wherein:

said first heat sink plate is made of a single piece and said first heat sink being formed with a recessed portion for supporting said one diode, and being formed with an aperture for receiving each of said second diodes.

10. The rectifier assembly as recited in claim 7, wherein:

said second heat sink is divided into a plurality of separate units.

11. The rectifier assembly as recited in claim 9, wherein:

said recessed region of said positive heat sink is positioned substantially in the same plane as said negative heat sink.

* * * * *